(12) United States Patent
Konrad et al.

(10) Patent No.: US 11,987,127 B2
(45) Date of Patent: May 21, 2024

(54) ACTUATING DEVICE AND METHOD FOR OPERATING AN ACTUATING DEVICE

(71) Applicant: MERCEDES-BENZ GROUP AG, Stuttgart (DE)

(72) Inventors: Tobias Konrad, Böblingen (DE); Martin Lindmayer, Sulz (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 143 days.

(21) Appl. No.: 17/769,497

(22) PCT Filed: Oct. 1, 2020

(86) PCT No.: PCT/EP2020/077527
§ 371 (c)(1),
(2) Date: Apr. 15, 2022

(87) PCT Pub. No.: WO2021/073888
PCT Pub. Date: Apr. 22, 2021

(65) Prior Publication Data
US 2023/0241975 A1 Aug. 3, 2023

(30) Foreign Application Priority Data
Oct. 18, 2019 (DE) ..................... 10 2019 007 271.5

(51) Int. Cl.
*G06F 3/041* (2006.01)
*B60K 35/10* (2024.01)
(Continued)

(52) U.S. Cl.
CPC ............ *B60K 35/10* (2024.01); *E05B 17/226* (2013.01); *E05B 81/64* (2013.01); *B60K 35/29* (2024.01);
(Continued)

(58) Field of Classification Search
CPC ........ B60K 2370/197; B60K 2370/788; B60K 37/06; B60R 25/20; E05B 17/226; E05B 81/64
See application file for complete search history.

(56) References Cited

U.S. PATENT DOCUMENTS 9,925,953 B2 3/2018 Pribisic et al.
10,480,221 B2 11/2019 Cumbo
(Continued)

FOREIGN PATENT DOCUMENTS

DE 20212143 U1 1/2003
DE 10324918 A1 2/2004
(Continued)

OTHER PUBLICATIONS

International Search Report mailed Dec. 17, 2020 in related/corresponding International Application No. PCT/EP2020/077527.
(Continued)

*Primary Examiner* — Insa Sadio
(74) *Attorney, Agent, or Firm* — PATENT PORTFOLIO BUILDERS PLLC

(57) ABSTRACT

An actuating device for controlling a functional component of a motor vehicle is arranged on the motor vehicle. The motor vehicle has a functional component for providing a vehicle function and a display actuation device arranged on the motor vehicle for controlling a functional component. The display actuation device has a display providing visually detectable function actuation elements. In order to activate a vehicle function the display actuation device has a release device so that the display can be actuated between a blocking position blocking the actuation of the function actuation elements and an active position releasing the actuation of the function actuation elements. The display actuation device has a key element that cooperates with the
(Continued)

Figure 1:
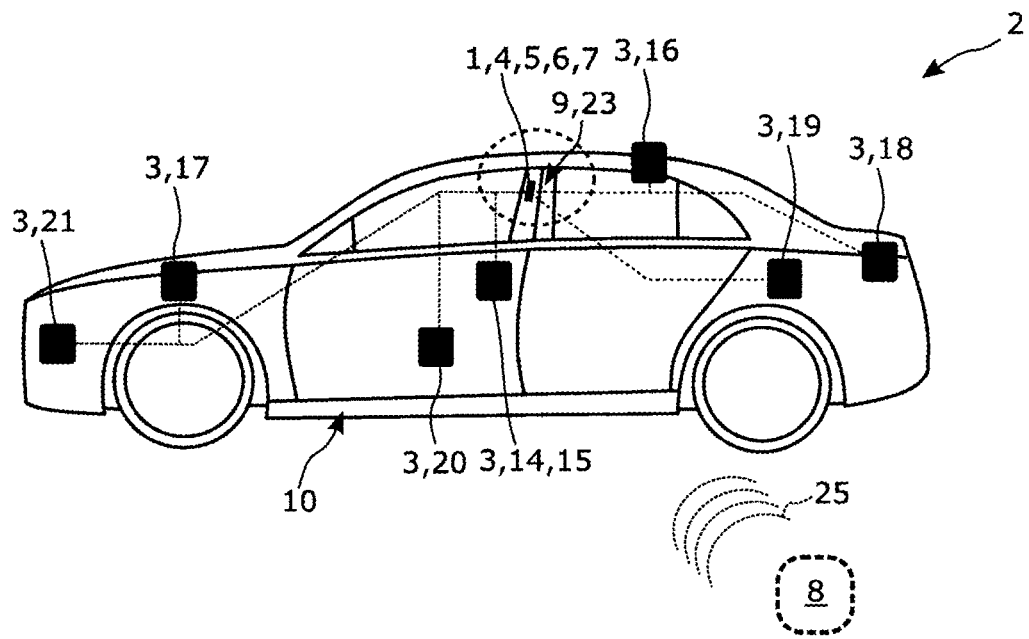

release device and, when cooperating with the release device, actuates the display means into the active position.

14 Claims, 1 Drawing Sheet

(51) Int. Cl.
*E05B 17/22* (2006.01)
*E05B 81/64* (2014.01)
*B60K 35/29* (2024.01)
*B60K 35/60* (2024.01)

(52) U.S. Cl.
CPC ........ *B60K 35/60* (2024.01); *B60K 2360/197* (2024.01); *B60K 2360/788* (2024.01)

(56) References Cited

U.S. PATENT DOCUMENTS

| | | | |
|---|---|---|---|
| 11,136,000 | B2 | 10/2021 | Cumbo |
| 2005/0090946 | A1 | 4/2005 | Pickering et al. |
| 2015/0233145 | A1* | 8/2015 | Kuriyama ............... E05B 81/04 292/201 |
| 2015/0353033 | A1 | 12/2015 | Pribisic et al. |
| 2017/0018129 | A1 | 1/2017 | Huebner |
| 2017/0072907 | A1* | 3/2017 | Pribisic ................... B60R 25/23 |
| 2018/0367139 | A1 | 12/2018 | Pribisic et al. |

FOREIGN PATENT DOCUMENTS

| | | |
|---|---|---|
| DE | 102006019730 A1 | 10/2007 |
| DE | 102013009168 A1 | 12/2013 |
| DE | 102013004612 A1 | 9/2014 |
| DE | 102015108609 A1 | 12/2015 |
| DE | 102015109006 A1 | 12/2015 |
| DE | 102016224260 A1 | 6/2018 |
| DE | 102018209576 A1 | 12/2018 |
| DE | 102018117477 A1 | 1/2019 |
| DE | 102018128539 A1 | 6/2019 |
| EP | 3118050 A2 | 1/2017 |
| EP | 3248858 A1 | 11/2017 |

OTHER PUBLICATIONS

Office Action created Aug. 27, 2020 in related/corresponding DE Application No. 10 2019 007 271.5.
Written Opinion mailed Dec. 17, 2020 in related/corresponding International Application No. PCT/EP2020/077527.

* cited by examiner

ACTUATING DEVICE AND METHOD FOR OPERATING AN ACTUATING DEVICE

BACKGROUND AND SUMMARY OF THE INVENTION

Exemplary embodiments of the invention relate to an actuating device for a road motor vehicle, as well as to a method for operating an actuating device.

Actuating devices for road motor vehicles have been known for a long time and usually serve to actuate functional components arranged in the respective road motor vehicle in accordance with user specifications. In the course of time, efforts have been made to optimize the known actuating devices for road motor vehicles, in particular in order to meet the user's increased demands for comfort.

A control device and an operating device for an adjustment device of a motor vehicle are known from DE 202 12 143 U1 and DE 103 24 918 A1. Among other things, an operating device for inputting control signals for manually controlling the adjusting device is described, wherein an adjusting element of the adjusting device can be adjusted a distance or to an adjusting position by means of a drive controlled by the drive device. The operating surface of the operating device is designed for inputting an operating distance and/or an operating position on the operating surface, wherein the operating distance correlates to the adjustment distance or the operating position correlates to the adjustment position.

Furthermore, a technique for controlling standing functions of a user vehicle having a driver's cab is known from EP 3 248 858 A1, wherein the driver's cab comprises an operating device with operating elements for controlling the standing functions of the user vehicle. The operating elements on the driver's cab are arranged so as to be accessible from outside the driver's cab.

Exemplary embodiments of the invention provide an improved or at least another embodiment for an actuating device, as well a method for operating an actuating device.

The basic idea of the invention is to arrange a display actuating device of an actuating device on a road motor vehicle, wherein the display actuating device is equipped with a release device and can be actuated by the latter selectively from a blocking position into an active position by means of a key element cooperating with the release device. In the active position, the display actuation device offers function actuation elements for actuation by the user, by means of which vehicle functions provided by functional components of the road motor vehicle can be selectively activated.

For this purpose, it is provided that an actuating device for a road motor vehicle, in particular an electrically drivable road motor vehicle, for controlling a functional component arranged on the road motor vehicle is equipped with at least one functional component arranged on a road motor vehicle, in particular a door lock, a door opener, a window lifter, a sliding roof drive, a hood drive, a trunk lid drive, a radio module, a tailgate drive, a central locking system and/or a camera device, for providing a vehicle function. A display actuation device for controlling one of the functional components is also arranged on the road motor vehicle, wherein the display actuating device comprises display means, in particular a touch control panel or a display. The display means serve to provide visually detectable function actuation elements, in particular function actuation symbols or automotive pictograms.

It is significant for the invention that, in order to activate a vehicle function, a function actuation element is connected to a function component in each case, expediently by means of a cable connection or wirelessly by means of a wireless connection. The function actuation elements are designed to be actuatable for controlling the function components, i.e., for activating a vehicle function. Furthermore, it is provided that the display actuation device has a release device by means of which the display means can be actuated back and forth between a blocking position blocking the actuation of the function actuation elements and an active position releasing the actuation of the function actuation elements. The release device is actuatable by means of a key element of the actuating device cooperating with the release device, such that when the key element cooperates with the release device, the display device is actuated into the active position. This has the advantage that the display means can be activated easily and relatively conveniently by the user. Furthermore, the actuating device has the advantage that it can be used to replace other control elements, for example a corresponding control on the trunk lid.

Expediently, the display actuation device is arranged on a B-pillar of the road motor vehicle. This means that the display actuation device is advantageously arranged in an area of the road motor vehicle that is accessible to users, even manually. Further expediently, the display actuation device is arranged on a door-side cover of a B-pillar of the road motor vehicle, which also ensures more advantageous accessibility of the display actuation device. Further expediently, the display actuation device is arranged on a door-side cover of a B-pillar of the road motor vehicle, wherein the B-pillar is designed as a black panel. In this way, in particular the display means of the display actuation device can be designed in a visually advantageous and cost-effective manner. Finally, it can be imagined that the display actuation device is expediently arranged on an edge of the road motor vehicle. The display actuation device can further be arranged on doors, roof frames, a glazing of the road motor vehicle or an actuation device of a similar form, such that the present display actuation device or the actuation device can be used flexibly.

In particular, the actuating device can be equipped with display means for providing visually detectable function actuation elements. In this case, the display means are preferably formed by a touch control panel or a touch display or a touch display control panel, which allows convenient operation by the user, for example manually by hand.

The function actuation elements can each be formed by illuminated function actuation elements and expediently by illuminated function actuation symbols, further expediently by automotive pictograms. This has the effect that the function actuation elements can be visually sensed better than non-illuminated function actuation elements. A function actuation symbol preferably forms a function actuation element. A function actuation symbol is expediently an aesthetic shape designed with respect to the functional component assigned to it.

A function actuation element will expediently additionally indicate the operating status of the associated functional component.

Furthermore, in order to activate a vehicle function, a respective function actuation element can be actuated manually, expediently by hand. This has the advantage that no additional operating elements are necessary.

The display means and the function actuation elements can be arranged on a vehicle frame part of the road motor vehicle and be manually and visually accessible from outside a motor vehicle cabin comprised by the road motor vehicle. This allows users to reach the display means and the function actuation elements relatively conveniently, such that vehicle functions can be activated relatively easily and relatively quickly.

By way of example, in order to save energy, the display means can provide function actuation symbols in the active position in a predetermined or predeterminable active period, expediently for 10, 20, 30, 60, 120 seconds, and automatically switch back to the blocking position after the active period has expired, such that the display means are free of function actuation symbols and require no energy. However, an intelligent design of the display means is preferred, namely in such a way that the display means can provide function actuation elements in the active position in a predetermined or predeterminable active time period, which is expediently 10, 20, 30, 60, 120 seconds long, and automatically switch back to the locked position after the active time period has expired, provided that an actuation of a function actuation element has failed to occur within the active time period. If, on the other hand, a function actuation element is actuated within the active time period, a new predetermined or predeterminable active time period is started. This can save energy and increase user-friendliness.

The functional components of the actuating device can be designed according to the desired vehicle function and can therefore be selected practically at will. However, it is preferred if at least one functional component is formed by a door lock providing a door lock vehicle function. Additionally, or alternatively, a functional component may be formed by a door opener providing a door opener-door closer vehicle function. Further additionally or alternatively, a functional component may be formed by a window regulator providing a window opener-window closer vehicle function. Further additionally or alternatively, a functional component may be formed by a sunroof actuator providing a sunroof opener-sunroof closer vehicle function. Further additionally or alternatively, a functional component may be formed by a hood actuator providing a hood opener-hood closer vehicle function. It is also conceivable that a functional component is additionally or alternatively formed by a trunk lid drive that provides a trunk lid opener-trunk lid closer vehicle function. Further additionally or alternatively, a functional component can be formed by a radio module that provides a communication vehicle function. It is also conceivable that a functional component is additionally or alternatively formed by a tailgate drive that provides a tailgate opener-tailgate closer vehicle function. Further additionally or alternatively, a functional component can be formed by a central locking system that provides a central locking vehicle function. Finally, it can be imagined that additionally or alternatively a functional component is formed by a camera device that provides a surveillance or video vehicle function.

The invention comprises a method for operating an actuating device, in particular an actuating device according to the above description. To this end, it comprises an actuating device for a road motor vehicle for controlling a functional component arranged on the road motor vehicle and a functional component arranged on a road motor vehicle for providing a vehicle function. It further comprises a display actuator arranged on the road motor vehicle for controlling a functional component, display means formed by the display actuator for providing visually detectable function actuation elements. Furthermore, it comprises a release device formed by the display actuation device, by means of which release device the display means are actuatable back and forth between a blocking position blocking the actuation of the function actuation elements and an active position releasing the actuation of the function actuation elements, and a key element formed by the actuation device cooperating with the release device and adapted thereto. The method now provides the following substantial steps:

1) actuating the display means of the display actuation device, which are in the blocking position, into the active position of the display means by bringing the key element into a cooperating state with the release device of the display actuation device,
2) providing function actuation elements by means of the display means in a predetermined or predeterminable active period, expediently for 60 seconds,
3) automatically actuating the display means in the active position into the blocking position of the display means, after expiry of the active period and if no function actuation element has been actuated within the active period, or
4) maintaining the active position of the display means for a further predetermined or predeterminable new active period, expediently for 60 seconds, if a function actuation element has been actuated within the active period.

Expediently, the key element can be implemented as an electric radio key, in particular as a radio remote control, or as a keyless go system or as a polling system. Polling is implemented, in particular, by a cyclical interrogation of the access authorization of the key element.

Expediently, the actuation device can have an actuation evaluation logic, which is preferably arranged in or on the display actuation device. The actuation evaluation logic can control the provision of the function actuation elements by means of the display actuation device and, in particular, provide function actuation elements to be expected by the user. By way of example, when accessing the road motor vehicle, a function actuation element for a central locking/door opening can be provided first. Furthermore, the function actuation elements may be provided as required: for example, when a sunroof of the road motor vehicle is open, a function actuation element for actuating a sunroof drive is provided. Furthermore, the actuation evaluation logic may comprise a learning logic that implements prioritized provision of function actuation elements depending on the frequency of operation of the function actuation elements. By way of example, regular actuation of the trunk lid function actuation element results in automatic provision of the trunk lid function actuation element to the display means.

Expediently, the display means can display or provide one or more projection images of a camera device expediently arranged on the road motor vehicle, such that, for example, an interior, an underbody or the trunk or the area around or behind the road motor vehicle can be visualized. If necessary, information projections can also be provided, for example camera information.

Further important features and advantages of the invention emerge from the sub-claims, from the drawings and from the accompanying description of figures using the drawings.

It is understood that the above features and those to be explained below can be used not only in the combination indicated in each case, but also in other combinations or on their own, without leaving the scope of the present invention.

BRIEF DESCRIPTION OF THE DRAWING FIGURES

Preferred exemplary embodiments of the invention are depicted in the drawings and will be explained in more detail in the following description, wherein identical reference numerals refer to identical or similar or functionally identical components.

Figure 2:
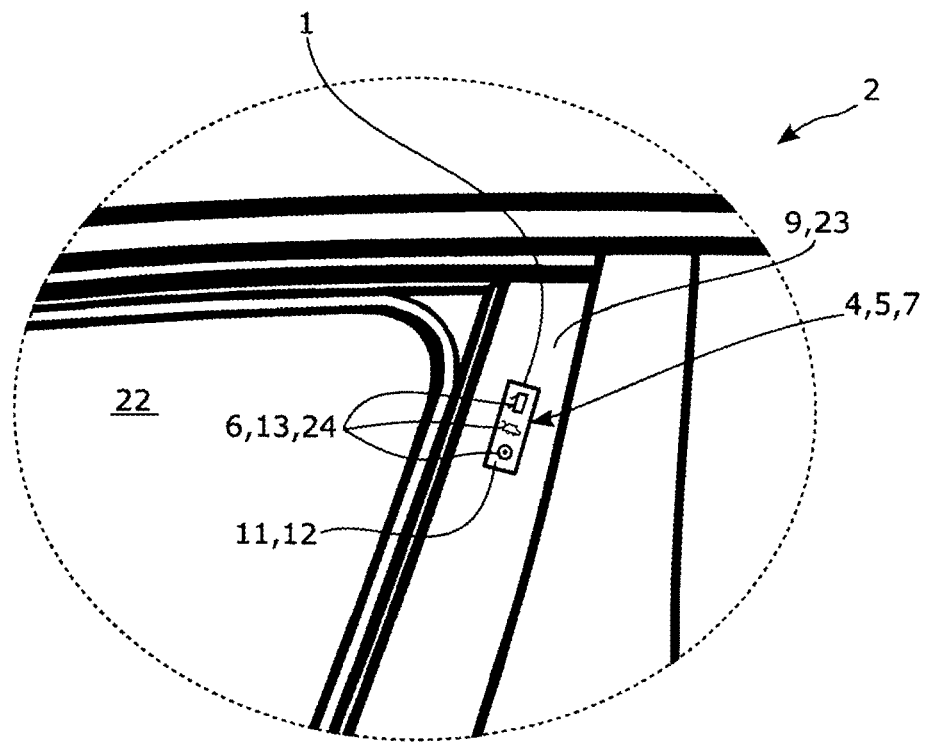

Here are shown, schematically in each case:

FIG. 1 in a highly simplified side view, a preferred exemplary embodiment of a road motor vehicle equipped with an actuating device having a display actuating device and functional components, FIG. 2 in a section framed with dashed lines, an enlarged detail of FIG. 1.

DETAILED DESCRIPTION

The drawings show in their entirety an actuating device, labelled with the reference numeral 1, for a road motor vehicle 2, the actuating device serving to control functional components 3 arranged on the road motor vehicle 2. Exemplary functional components 3 are door locks 14, door openers 15, window regulators, sunroof drives 16, hood drives 17, trunk lid drives 18, radio modules 19, tailgate drives, central locking systems 20, or camera devices 21.

FIG. 1 shows a highly simplified side view of a preferred exemplary embodiment of a road motor vehicle 2 having functional components 3, wherein the road motor vehicle 2 is equipped with an actuating device 1 having a display actuating device 4. The functional components 3 each provide a vehicle function for vehicle users. The display actuation device 4 is preferably arranged on or fixed to a door-side cover of a B-pillar 9 of the road motor vehicle 2 or an edge 10 of the road motor vehicle 2. The B-pillar 9 may be at least partially formed as a black panel 23.

In any case, the display actuation device 4 has display means 5 which serve to provide visually detectable function actuation elements 6. The function actuation elements 6 are preferably each formed by a function actuation symbol 13 reflecting the respective vehicle function of a function actuation element 6, see in particular FIG. 2. The function actuation symbols 13 can be implemented exemplarily as automotive pictograms 24, see FIG. 2. The display means 5 are exemplarily formed by a touch display and/or control panel 12, although they can also be formed by a touch control panel 11. Expediently, the function actuation elements 6 or the function actuation symbols 13 are designed to be illuminated such that individual function actuation elements 6 or function actuation symbols 13 can be more easily recognized by the eye than non-illuminated function actuation elements 6 or function actuation symbols 13.

To activate one of the vehicle functions, the function actuation elements 6 are each designed to be actuated and are connected to one of the functional components 3; according to FIG. 1 the connection is a wired cable connection, which is indicated there by dashed lines. This makes it possible to control the functional components 3 or activate the corresponding vehicle function by actuating the function actuation elements 6 or the function actuation symbols 13. According to FIG. 1, it is further indicated that the display actuation device 4 has a release device labelled with the reference numeral 7. By means of the release device 7, the display means 5 can be actuated back and forth between a blocking position and an active position. In the blocking position, actuation of the function actuation elements 6 is blocked, i.e., not possible. In the active position, actuation of the function actuation elements 6 is enabled, i.e., possible. It is preferable if the display means 5, after activation by means of a key element 8, remain in an active position for a predetermined or predeterminable active period, expediently for 60 seconds, in order to make function actuation elements 6 or function actuation symbols 13 available for actuation. If no user actuation of a function actuation element 6 or a function actuation element 13 takes place within the active period, the display means 5 automatically switch back to the blocking position after expiry of the active period. If a function actuation element 6 or a function actuation symbol 13 is actuated during the active period, a new active period begins with the actuation, which is expediently 60 seconds long.

FIG. 1 further shows that the display actuation device 4 has the aforementioned key element 8, which is coordinated with the release device 7 and can cooperate with the release device 7 to actuate the indicator means 5 to the active position. By way of example, a user may approach the road motor vehicle 2 with a key element 8 in their hand, whereby the release device 7 can cooperate with the key element 8. In this case, the key element 8 is exemplarily implemented as a radio key so that it can interact with the release device 7 in a contactless manner by means of radio waves 25.

In FIG. 2, a detail of FIG. 1 depicted enlarged is illustrated in a section framed with dashed lines. It can be seen that the display actuation device 4 is arranged on a door-side cover of a B-pillar 9 of the road motor vehicle 2, which is partially implemented as a black panel 23, and has display means 5 that are implemented as a touch display and/or control panel 12 or as a touch control panel 11. The function actuation elements 6, which are designed as function actuation symbols 13, in particular as automotive pictograms 24, can also be seen. The display means 5 or the function actuation elements 6 are arranged on the outside of the B-pillar 9 in such a way that a user from outside the road motor vehicle 2 or from outside a motor vehicle cabin 22 of the road motor vehicle 2 can manually and visually reach the display means 5 or the function actuation elements 6 in order to manually actuate the function actuation elements 6 or the function actuation symbols 13 there, for example.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. An actuating device of a road motor vehicle for controlling a functional component, which provides a vehicle function and is arranged on the road motor vehicle, the actuating device comprising:

a display actuation device arranged on the road motor vehicle and configured to control the functional component, wherein
the display actuation device comprises display means configured to provide a visually detectable function actuation element,
the visually detectable function actuation element is connected to the functional component and is configured, upon actuation, to activate the vehicle function,
the display actuation device further comprises a release device configured to actuate the display means between a blocking position blocking the actuation of the visually detectable function actuation element and an active position allowing the actuation of the visually detectable function actuation element, wherein in the blocking position the display means is free of the visually detectable function actuation element; and
a key element configured to cooperate with the release device to actuate the display means into the active position,
wherein the visually detectable function actuation element is a first visually detectable function actuation element, and wherein the display means is configured to provide one of a plurality of additional visually detectable function actuation elements depending upon frequency of operation of each of the plurality of additional visually detectable function actuation elements.

2. The actuating device of claim 1, wherein the display actuation device is arranged on
a B-pillar of the road motor vehicle,
a door-side cover of the B-pillar of the road motor vehicle,
the door-side cover of the B-pillar of the road motor vehicle, wherein the B-pillar is formed as a black panel, or
an edge of the road motor vehicle.

3. The actuating device of claim 1, wherein the display means is a touch control panel, a touch display, or control panel.

4. The actuating device of claim 1, wherein the function actuation element is formed by an illuminated function actuation symbol that is an automotive pictogram.

5. The actuating device of claim 1, wherein the visually detectable function actuation element visualizes an operating status of the functional component.

6. The actuating device of claim 1, wherein the visually detectable function actuation element is manually actuatable by a hand to activate the vehicle function.

7. The actuating device of claim 1, wherein the display means and the visually detectable function actuation element are arranged on a vehicle frame part of the road motor vehicle and are manually and visually accessible from outside a motor vehicle cabin comprised by the road motor vehicle.

8. The actuating device of claim 1, wherein the display means is configured to
provide the function actuation element in the active position for a predetermined active period,
automatically change to the blocking position after expiry of the predetermined active time period if an actuation of a function actuation element has not occurred within the predetermined active time period, and
provide the function actuation element in the active period for a new predetermined active time period when the function actuation element is actuated within the predetermined active period.

9. The actuating device of claim 1, wherein the functional component is
a door lock providing a door lock vehicle function,
a door opener providing a door opener-door closer vehicle function,
a window regulator providing a window opener-window closer vehicle function,
a sunroof drive providing a sunroof opener-sunroof closer vehicle function,
a hood drive providing a hood opener-hood closer vehicle function,
a trunk lid drive providing a trunk lid opener-trunk lid closer vehicle function,
a radio module providing a communication vehicle function,
a tailgate drive providing a tailgate opener-tailgate closer vehicle function,
a central locking system providing a central locking vehicle function, or
a camera device providing a surveillance or video vehicle function.

10. A method for operating an actuating device of a road motor vehicle for controlling a functional component, which provides a vehicle function and is arranged on the road motor vehicle, the actuating device comprising a display means that display a visually detectable function actuation element, the method comprising:
switching, responsive to a key element being brought into a cooperating state with a release device of the display actuation device, the display means from a blocking position blocking actuation of the visually detectable function actuation element to an active position allowing actuation of the visually detectable function actuation element, wherein in the blocking position the display means is free of the visually detectable function actuation element;
displaying, by the display means, the visually detectable function actuation element for a predetermined active period of time after switching the display means from the blocking position to the active position; and
automatically switching the display means from the active position to the blocking position if the visually detectable function actuation element has not been actuated within the predetermined active period of time, or maintaining the active position of the display means for a new predetermined active period if the visually detectable function actuation element is actuated within the predetermined active period of time,
wherein the visually detectable function actuation element is a first visually detectable function actuation element, and wherein the display means provides one of a plurality of additional visually detectable function actuation elements depending upon frequency of operation of each of the plurality of additional visually detectable function actuation elements.

11. A road motor vehicle, comprising:
a functional component configured to provide a vehicle function; and
an actuating device, comprising
a display actuation device arranged on the road motor vehicle and configured to control the functional component, wherein the display actuation device comprises display means configured to provide a visually detectable function actuation element, the visually detectable function actuation element is connected to the functional component and is configured, upon actuation, to activate the vehicle function, the display actuation device further comprises a release device configured to actuate the display means between a blocking position blocking the actuation of the visually detectable function actuation element and an active position allowing the actuation of the visually detectable function actuation element, wherein in the blocking position the display means is free of the visually detectable function actuation element; and a key element configured to cooperate with the release device to actuate the display means into the active position, wherein the visually detectable function actuation element is a first visually detectable function actuation element, and wherein the display means is configured to provide one of a plurality of additional visually detectable function actuation elements depending upon frequency of operation of each of the plurality of additional visually detectable function actuation elements.

12. The actuating device of claim 1, wherein the display means is configured to display one or more projection images of a camera arranged on the road motor vehicle.

13. The method of claim 10, wherein the display means displays one or more projection images of a camera arranged on the road motor vehicle.

14. The road motor vehicle of claim 11, further comprising:

a camera arranged on the road motor vehicle, wherein the display means is configured to display one or more projection images of the camera.

\* \* \* \* \*